US006981861B2

(12) United States Patent
Park

(10) Patent No.: US 6,981,861 B2
(45) Date of Patent: Jan. 3, 2006

(54) FOAMING MOLD USING HOLLOW TUBES

(75) Inventor: Sung Kuk Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 161 days.

(21) Appl. No.: 10/716,667

(22) Filed: Nov. 20, 2003

(65) Prior Publication Data

US 2005/0053683 A1 Mar. 10, 2005

(30) Foreign Application Priority Data

Sep. 8, 2003 (KR) ................................ 10-2003-0062590

(51) Int. Cl.
*B29C 44/14* (2006.01)

(52) U.S. Cl. .................... 425/127; 425/405.1; 425/812; 425/817 R; 425/4 R; 249/65

(58) Field of Classification Search ................ 425/4 R, 425/127, 129.1, 470, 812, 817 R; 249/65
See application file for complete search history.

(56) References Cited

U.S. PATENT DOCUMENTS 4,626,185 A * 12/1986 Monnet ...................... 425/110
5,753,538 A * 5/1998 Kuno et al. ................. 438/127
2004/0116646 A1 * 6/2004 Choi et al. .................... 528/66
2004/0247834 A1 * 12/2004 Ludwig et al. ............. 428/157

FOREIGN PATENT DOCUMENTS

JP 04-97806 * 3/1992

OTHER PUBLICATIONS

English abstract for JP 04–97806.*

* cited by examiner

*Primary Examiner*—Donald Heckenberg
(74) *Attorney, Agent, or Firm*—Greenblum & Bernstein, P.L.C.

(57) ABSTRACT

The present invention relates to a foaming mold using hollow tubes, and more particularly, to an improved mold for use in manufacturing a foamed product through foaming (or expansion molding), in which gas generated from the foamed product during the foaming can be smoothly discharged to the outside. The foaming mold using the hollow tubes comprises a mold unit including separate first and second half molds having inner cavities engraved in conformity with a molded product; the plurality of hollow tubes that are isolated and sealed from one another in respective regions and located between the first and second half molds to enclose an outer periphery of the configuration of the molded product; and a plurality of vents that are formed within the second half mold to communicate with the hollow tubes so that air in the isolated hollow tubes can be independently vented. According to the present invention, it is possible to improve the quality of the final molded product obtained through the foaming.

2 Claims, 3 Drawing Sheets

FOAMING MOLD USING HOLLOW TUBES

RELATED APPLICATIONS

The present disclosure relates to subject matter contained in Korean Application No. 10-2003-0062590, filed on Sep. 8, 2003, which is herein expressly incorporated by reference its entirety.

BACKGROUND OF THE INVENTION

1. Field of Invention

The present invention relates to a foaming mold using hollow tubes, and more particularly, to an improved mold for use in manufacturing a foamed product through foaming (or expansion molding), in which gas generated from the foamed product during the foaming can be smoothly discharged to the outside, thereby improving the quality of the final foamed product.

2. Description of the Prior Art

Generally, a foamed product is a product having a specific configuration desired by an operator, which is obtained by injecting a liquid foaming material into a mold having a cavity engraved in conformity with the desired configuration, and foaming and curing the liquid foaming material within the mold. The curing of the liquid foaming material into the foamed product can proceed or be facilitated by maintaining an atmosphere for the liquid foaming material within a specific temperature range or by adding chemical additives to the liquid foaming material.

Further, as for such a foamed product, it is possible to obtain a molded product comprising only a foam made through the curing of a liquid foaming material by filling a mold with only the liquid foaming material, curing the liquid foaming material and removing the mold. Alternatively, it is also possible to obtain a molded product into which a skin, a core and a foam such as a urethane pad made through the curing of a liquid foaming material are integrally incorporated by stacking the skin and core in a mold, filling the liquid foaming material between the skin and the core and curing the liquid foaming material.

Particularly, a vehicle instrument panel is a typical example of a molded product comprising a skin, a core and a foam pad as in the latter.

To produce such a molded product comprising a foam, when a liquid foaming material is injected into a mold, a sealing structure capable of preventing the leakage of the injected liquid foaming material from the mold is further required. Further, in order to obtain a good quality of a molded product comprising a foam made through foaming, there is a need for a degassing process by which gas generated while a liquid foaming material is cured into the foam during the foaming is discharged to the outside of the mold.

FIG. 1 is a sectional view showing a conventional foaming mold, and FIG. 2 is a sectional view illustrating a degassing process in the conventional foaming mold.

As shown in FIGS. 1 and 2, the conventional foaming mold comprises a mold unit 10 including separate first and second half molds 11 and 12 with inner cavities engraved in conformity with the configuration of a molded product 30; and a resilient sealing projection 20 fixed between the first and second half molds 11 and 12 of the mold unit 10 to enclose an outer periphery of the configuration of the molded product 30.

As shown in FIG. 1, the conventional foaming mold thus constructed is provided with the mold unit 10 including the first and second half molds 11 and 12 that have the cavities engraved in conformity with the configuration of the molded product 30 and are stacked one above another. Between the first and second half molds 11 and 12, the resilient sealing projection 20 having a circular cross section, for example, is fixed to and protrudes from one of the half molds while enclosing the outer periphery of the configuration of the molded product 30. Accordingly, when a liquid foaming material is injected into the mold unit 10, the foaming material is prevented from leaking out from the mold unit 10.

In order to produce the final molded product 30 comprising the skin 31, the core 32 and the pad 33 through the foaming using the conventional foaming mold described above, the core 32 and the skin 31 are stacked one above another between the first and second half molds 11 and 12, a liquid foaming material such as urethane is injected and cured between the core 32 and the skin 31, and the injected foaming material is molded into the pad 33 as a foam. Thus, the pad 33 is integrally combined with the core 32 and the skin 31 to form the final molded product 30.

Thus, a manufacturer can obtain the final molded product 30 comprising the foam having a desired configuration by means of the mold unit 10 provided with the sealing projection 20.

In performing the foaming using the conventional foaming mold, the degassing process of discharging gas, which is generated from the foam upon curing the liquid foaming material, to the outside of the mold is required during the foaming in order to prevent the deterioration of the quality of the product due to the presence of the remaining gas in the molded product 30, as shown in FIG. 2.

However, since the conventional foaming mold is not provided with an additional means for discharging the gas generated from the foam to the outside of the mold, the gas is discharged from the foam merely by causing two half molds to be spaced apart by a predetermined distance from each other. If the degassing is performed over an entire surface of the foam in such a manner at once, there are problems in that the efficiency of degassing is lowered and thus the quality of the foam is not uniform, whereby the resultant quality of the final molded product is deteriorated.

SUMMARY OF THE INVENTION

The present invention is conceived to solve the aforementioned problems. An object of the present invention is to provide a foaming mold using hollow tubes, wherein gas generated from a foam molded in a mold during foaming is smoothly discharged to the outside of the mold locally from respective regions partitioned in the mold, thereby improving the quality of a final molded product obtained through the foaming.

According to the present invention for achieving the object, there is provided a foaming mold using hollow tubes, comprising a mold unit including separate first and second half molds having inner cavities engraved in conformity of a molded product; the plurality of hollow tubes that are isolated and sealed from one another in respective regions and located between the first and second half molds to enclose an outer periphery of the configuration of the molded product; and a plurality of vents that are formed within the second half mold to communicate with the hollow tubes so that air in the isolated hollow tubes can be independently vented.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
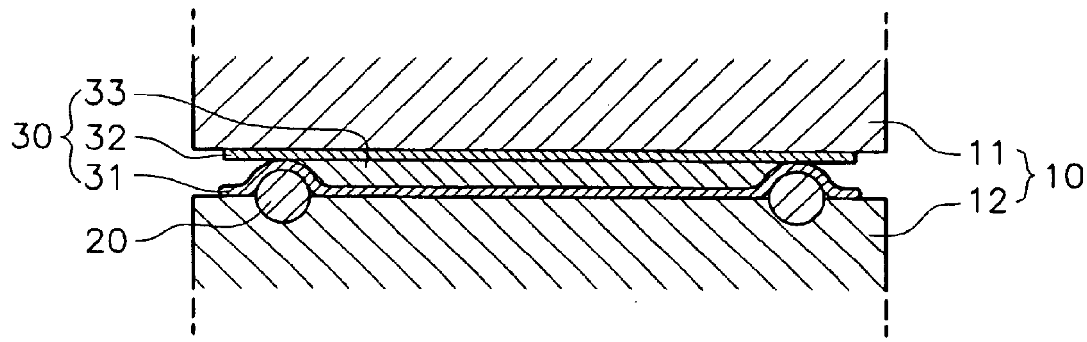
FIG. 1 is a sectional view showing a conventional foaming mold.
Figure 2:
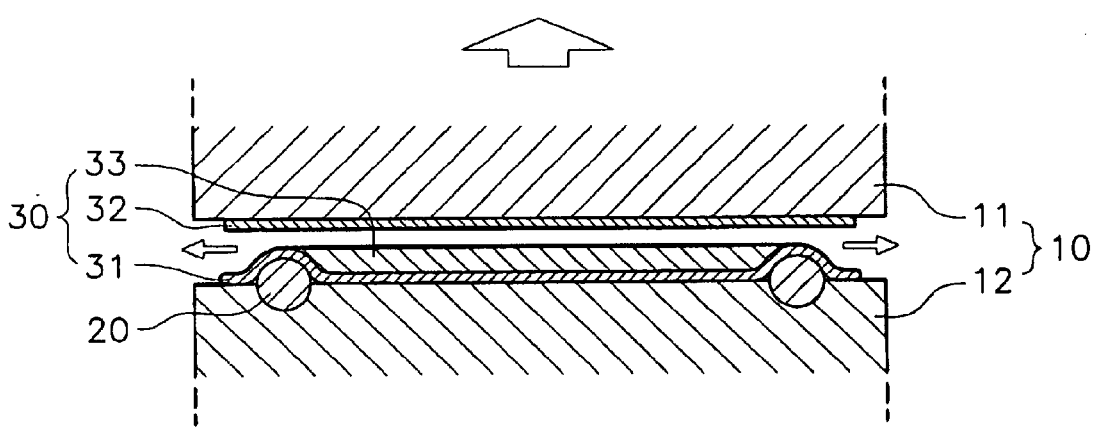
FIG. 2 is a sectional view illustrating a degassing process in the conventional foaming mold.
Figure 3:
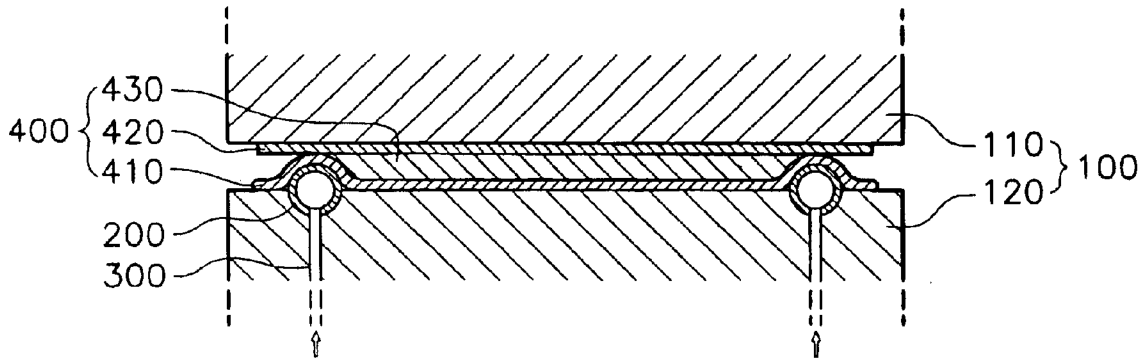
FIG. 3 is a front sectional view of an embodiment of a foaming mold using hollow tubes according to the present invention.
Figure 4:
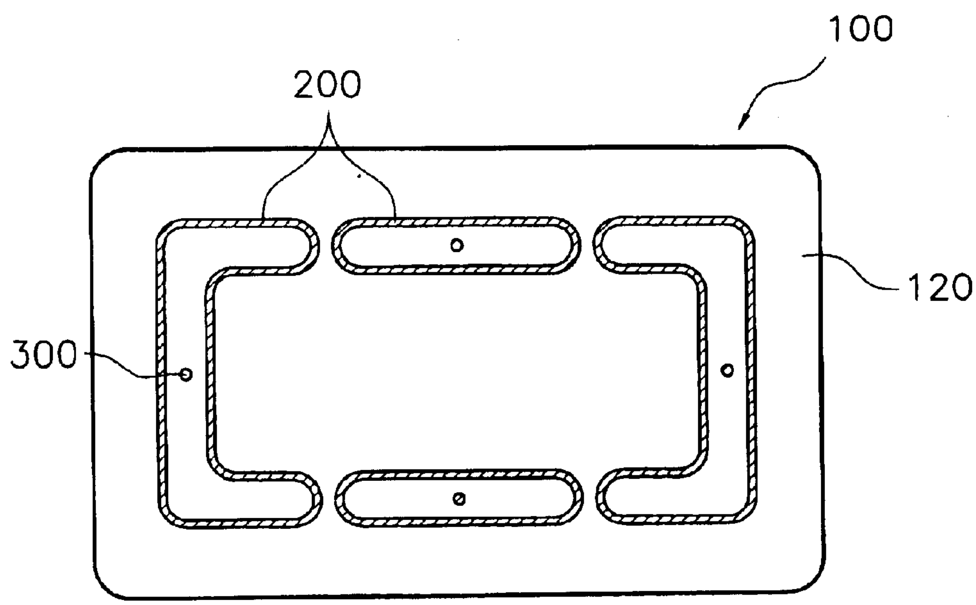
FIG. 4 is a partial sectional plan view showing a second mold and the hollow tubes in the embodiment of the foaming mold using the hollow tubes according to the present invention.
Figure 5:
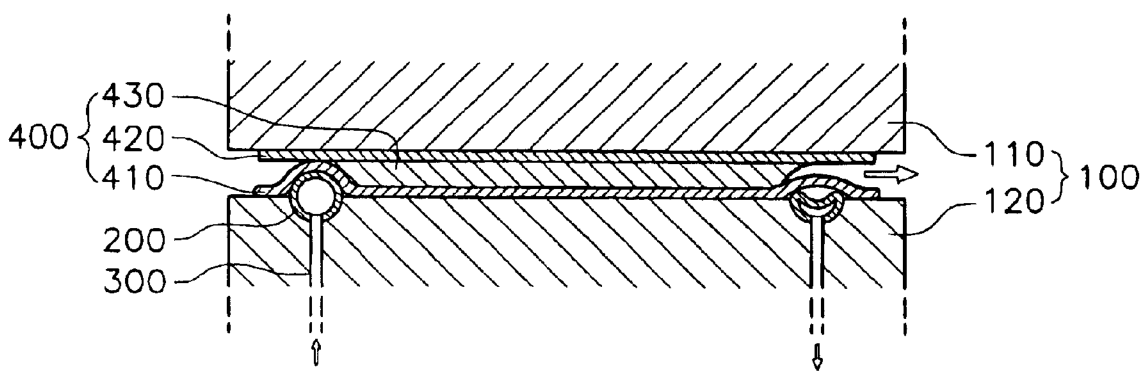
FIG. 5 is a front sectional view illustrating a degassing process in the embodiment of the foaming mold using the hollow tubes according to the present invention.

FIG. 3 is a front sectional view of an embodiment of a foaming mold using hollow tubes according to the present invention, FIG. 4 is a partial sectional plan view showing a second mold and the hollow tubes in the embodiment of the foaming mold using the hollow tubes according to the present invention, and FIG. 5 is a front sectional view illustrating a degassing process in the embodiment of the foaming mold using the hollow tubes according to the present invention.

As shown in FIGS. 3 to 5, in the embodiment, the foaming mold using the hollow tubes according to the present invention comprises a mold unit 100 including separate first and second half molds 110 and 120 having inner cavities engraved in conformity with a molded product 400; the plurality of hollow tubes 200 that are isolated and sealed from one another in respective regions and located between the first and second half molds 110 and 120 to enclose an outer periphery of the configuration of the molded product 400; and a plurality of vents 300 that are formed within the second half mold 120 to communicate with the hollow tubes 200 so that air in the isolated hollow tubes 200 can be independently vented.

Here, the mold unit 100 may be used for producing the molded product 400, such as a vehicle instrument panel that comprises a pad 430 as a foam made of urethane, a skin 410 and a core 420.

The operation of the foaming mold according to the present invention will be described with reference to FIGS. 3 to 5.

As shown in FIGS. 3 and 4, in the embodiment of the foaming mold using the hollow tubes according to the present invention, the foaming mold is provided with the mold unit 100 including the first and second half molds 110 and 120 that have the cavities engraved in conformity with the configuration of the molded product 400 and are stacked one above another. Between the first and second half molds 110 and 120 of the mold unit 100, the hollow tubes 200 that, for example, are made of a resilient material and have a circular cross section are fixed to enclose the outer periphery of the molded product 400.

At this time, as shown in FIG. 4, the hollow tubes 200 are properly isolated from one another in a plurality of regions on the second half mold 120. Preferably, the lower half of each hollow tube 200 is fixedly embedded in the second half mold 120, and at least one vent 300 extending toward a lower portion of the second half mold 120 is formed to communicate with each of the hollow tubes 200.

Therefore, an operator can selectively inject air into or discharge air from the hollow tubes 200 through the vents 300 so that the hollow tubes 200 can be filled with the air and then inflated, or contracted by means of the discharge of the air from the hollow tubes 200.

When the hollow tubes 200 are inflated by injecting the air through the vents 300, the inflated hollow tubes 200 prevent a liquid foaming material, which has been injected into the mold unit 100, from leaking out between the first and second half molds 110 and 120, as shown in FIG. 3. On the contrary, when the hollow tubes 200 are contracted by discharging the air through the vents 300 as shown in FIG. 5, gas generated from a foam obtained through the curing of the foaming material can be easily discharged through a gap created due to the contraction of the hollow tubes 200 and a space between the first and second half molds 110 and 120.

To produce the final molded product 400 comprising the skin 410, the core 420, and the pad 430 through the foaming using the foaming mold using the hollow tubes according to the present invention, the core 420 and the skin 410 are first stacked one above another between the first and second half molds 110 and 120. Thereafter, the liquid foaming material such as urethane is injected and cured between the core 420 and the skin 410. Then, the injected foaming material such as urethane is molded into the pad 430 as a foam through the foaming. The foam pad 430 is integrally combined with the core 420 and the skin 410 to form the final molded product 400 such as a vehicle instrument panel.

At this time, upon molding the molded product 430 through the foaming, a degassing process is performed to prevent gas generated during the curing of the foaming material from being captured in the foam pad 430 of the molded product 430. Upon performing the foaming using the foaming mold according to the present invention, the gas generated from the foam of the molded product 400 can be easily discharged to the outside of the mold unit 100 by contracting the hollow tubes 200 using the hollow tubes 200 and the vents 300 of the second half mold 120, which are additionally provided in accordance with the present invention, to create a gap between the first and second half molds 110 and 120.

The degassing process of discharging the gas from the foam (i.e., pad 430) of the molded product 400 through the foaming mold according to the present invention will be explained in detail with reference to the accompanying drawings.

When the liquid foaming material is intended to be injected into the mold unit 100 including the first and second half molds 110 and 120, air is first injected into all the hollow tubes 200, which are fixed to the second half mold 120 to enclose the outer periphery of the configuration of the molded product 400, through the vents 300 to inflate the hollow tubes 200.

Thereafter, the core 410 and the skin 420 are stacked one above another between the first and second half molds 110 and 120, and the foaming material is injected therebetween.

At this time, the foaming material injected into the mold unit 100 as such is prevented from leaking out between the core 410 and the skin 420 by means of the inflated hollow tubes 200, as shown in FIG. 3, and is then foamed and cured therein to mold the foam.

After a predetermined period of time passes, the operator discharges air from one of the inflated hollow tubes 200 through the relevant vent 300. Accordingly, the hollow tube 200 from which the air is discharged is contracted and the gas generated from the foam escapes through the gap created due to the contraction of the hollow tube 200 and the space between the first and second half molds 110 and 120.

For example, in a case where four hollow tubes 200 are provided in the mold unit 100 to enclose the outer periphery of the configuration of the molded product 400 as shown in FIG. 4, if air is discharged from the right hollow tube 200 in the figure through the relevant vent 300, only the right hollow tube 200 is contracted and thus a gap is created between the first and second half molds 110 and 120, as shown in FIG. 5. Accordingly, only gas remaining in a right region of the resultant foam of the molded product 400 locally escapes through the created gap.

Then, such a degassing process is sequentially performed with respect to the remaining hollow tubes 200, so that gas generated from the molded product 400 comprising the foam can be effectively discharged, through gaps created due to the contraction of the hollow tubes 200, locally from respective regions, e.g., upper and lower regions, and right and left regions. Thus, it is possible to prevent the deterioration of the quality of the molded product 400, which occurs when the gas is discharged from the entire surface of the molded product 400 at once in the prior art.

According to the foaming mold of the present invention, the gas generated from the resultant foam during the foaming can be easily discharged locally from the respective regions of the mold unit 100 through the gaps between the first and second half molds 110 and 120 created by using the additional hollow tubes 200 and vents 300. Thus, there is an advantage in that the degassing process can be effectively performed, thereby obtaining the good quality of the final molded product 400.

As described above, the present invention improves the quality of the final molded product obtained through the foaming by smoothly discharging the gas generated from the foam molded in the mold during the foaming, to the outside of the mold locally from respective regions partitioned in the mold.

What is claimed is:

1. A foaming mold using hollow tubes, comprising:

a mold unit including separate first and second molds having inner cavities engraved in conformity of a molded product;

said plurality of hollow tubes being isolated and sealed from one another in respective regions and located between the first and second molds to enclose an outer periphery of the molded product; and a plurality of vents that are formed within the second mold to communicate with the hollow tubes so that air in the isolated hollow tubes can be independently vented.

2. The mold as claimed in claim 1, wherein the molded product is a vehicle instrument panel comprising a foam pad made of urethane, a skin and a core.

* * * * *